United States Patent [19]
Akahira et al.

[11] Patent Number: 6,109,727
[45] Date of Patent: Aug. 29, 2000

[54] INK-JET PRINTER AND PRINTING METHOD, AUXILIARY MEMBER, INK-JET HEAD, WARP CORRECTION METHOD, INK-JET HEAD UNIT AND COLOR-MIXTURE REDUCING METHOD

[75] Inventors: Makoto Akahira; Hiromitsu Yamaguchi, both of Kawasaki, Japan

[73] Assignee: Canon Kabushiki Kaisha, Tokyo, Japan

[21] Appl. No.: 08/939,481

[22] Filed: Sep. 29, 1997

[30] Foreign Application Priority Data

Sep. 30, 1996 [JP] Japan .................................. 8-259164
Sep. 11, 1997 [JP] Japan .................................. 9-246930

[51] Int. Cl.$^7$ .................................................. B41J 2/155
[52] U.S. Cl. ............................................. 347/42; 347/107
[58] Field of Search ..................................... 347/106, 107, 347/42, 40, 44

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,343,227 | 8/1994 | Hirosawa et al. | 349/42 |

FOREIGN PATENT DOCUMENTS

| | | |
|---|---|---|
| 0 440 469 | 8/1991 | European Pat. Off. . |
| 0 512 799 | 11/1992 | European Pat. Off. . |
| 0 636 485 | 2/1995 | European Pat. Off. . |
| 0 670 220 | 9/1995 | European Pat. Off. . |
| 0 683 406 | 11/1995 | European Pat. Off. . |
| 704722 | 3/1996 | European Pat. Off. .......... G02B 5/20 |
| 54-56847 | 5/1979 | Japan . |
| 59-75205 | 4/1984 | Japan . |
| 59-123670 | 7/1984 | Japan . |
| 59-138461 | 8/1984 | Japan . |
| 60-71260 | 4/1985 | Japan . |
| 1-122441 | 5/1989 | Japan . |
| 1-217320 | 8/1989 | Japan . |
| 2-16054 | 1/1990 | Japan .................................. 347/44 |
| 3-290256 | 12/1991 | Japan . |
| 63-235901 | 8/1998 | Japan . |

*Primary Examiner*—John Barlow
*Assistant Examiner*—Michael S. Brooke
*Attorney, Agent, or Firm*—Fitzpatrick, Cella, Harper & Scinto

[57] ABSTRACT

An ink-jet printer capable of reducing temperature rise of an ink-jet head to the utmost. The printer comprises a long ink-jet head in which a plurality of ink-discharge nozzles are arrayed in a lengthwise direction and a plate auxiliary member attached to the ink-jet head along the lengthwise direction. The auxiliary member has a predetermined volume to increase the thermal capacity of the ink-jet head, and has a plurality of warp correction portions provided at positions corresponding to different positions in the lengthwise direction of the ink-jet head, to provide a function to correct warp of the ink-jet head.

15 Claims, 18 Drawing Sheets

7 : LIGHT TRANSMITTING PORTION
2 : BLACK MATRIX
1 : SUBSTRATE

3' : RESIN COMPOSITION LAYER hv
4' : PHOTOMASK
5' : UNCOLORED PORTION

INK-JET HEAD
R G B hv

8 : PROTECTIVE LAYER

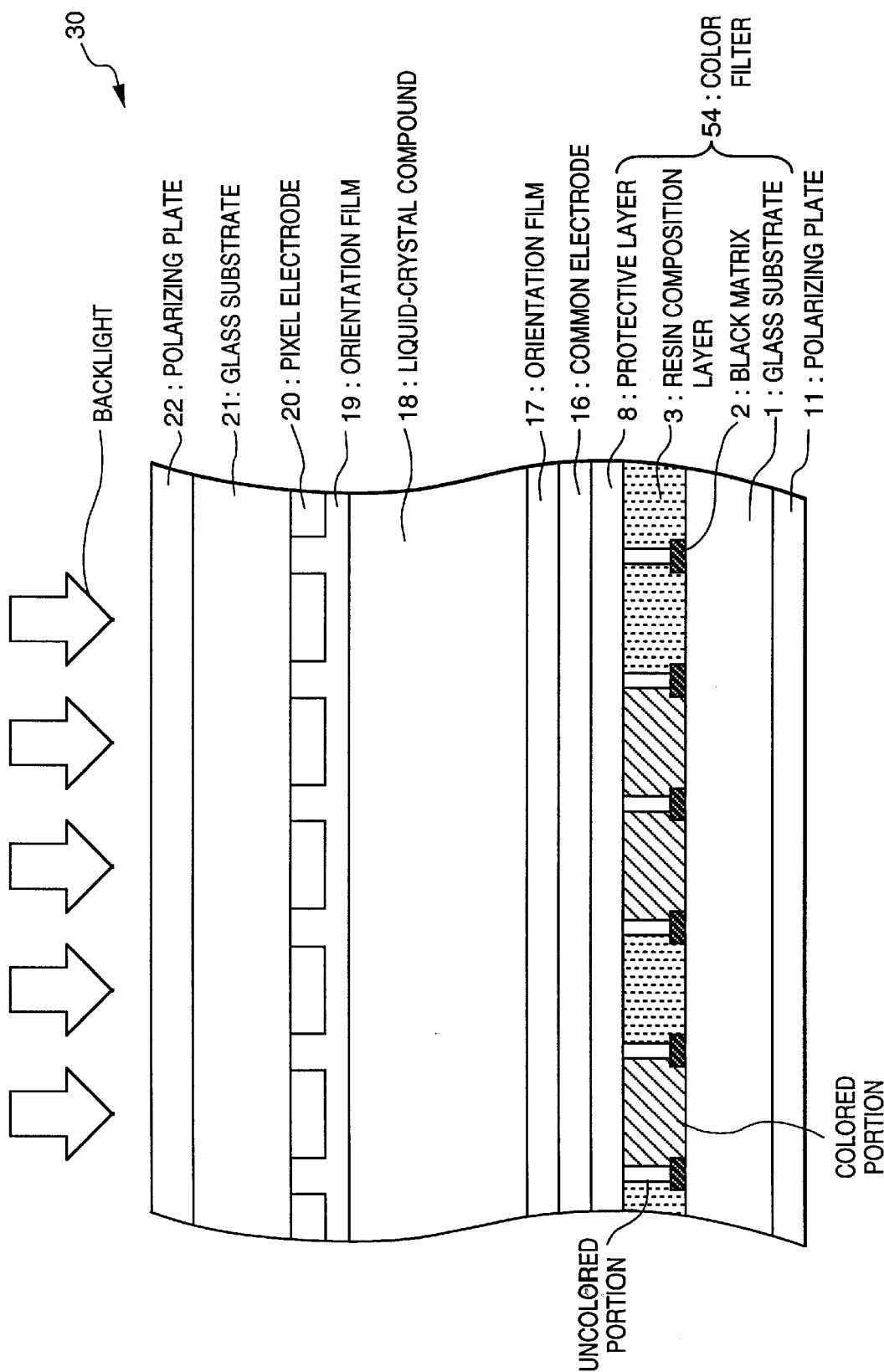

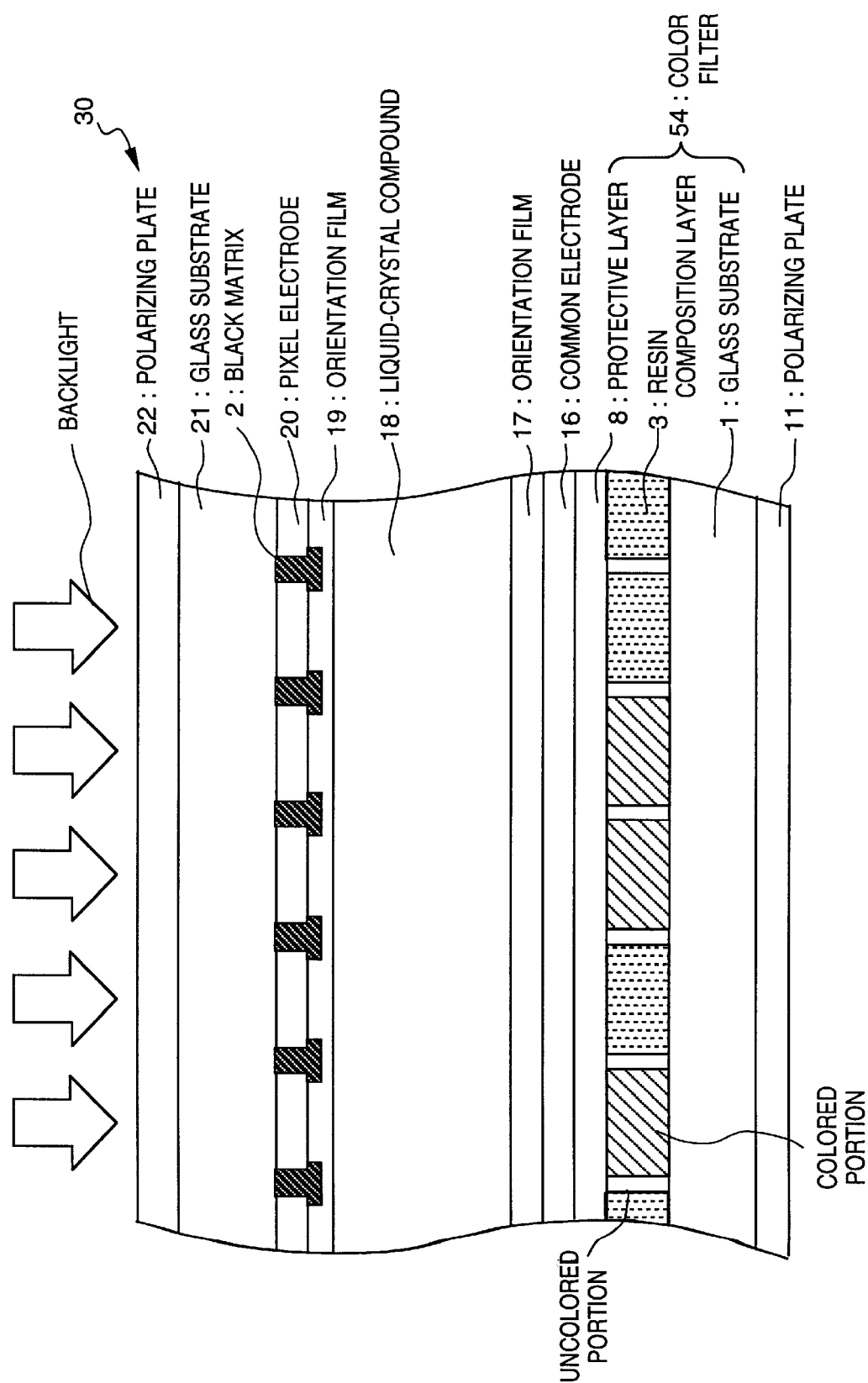

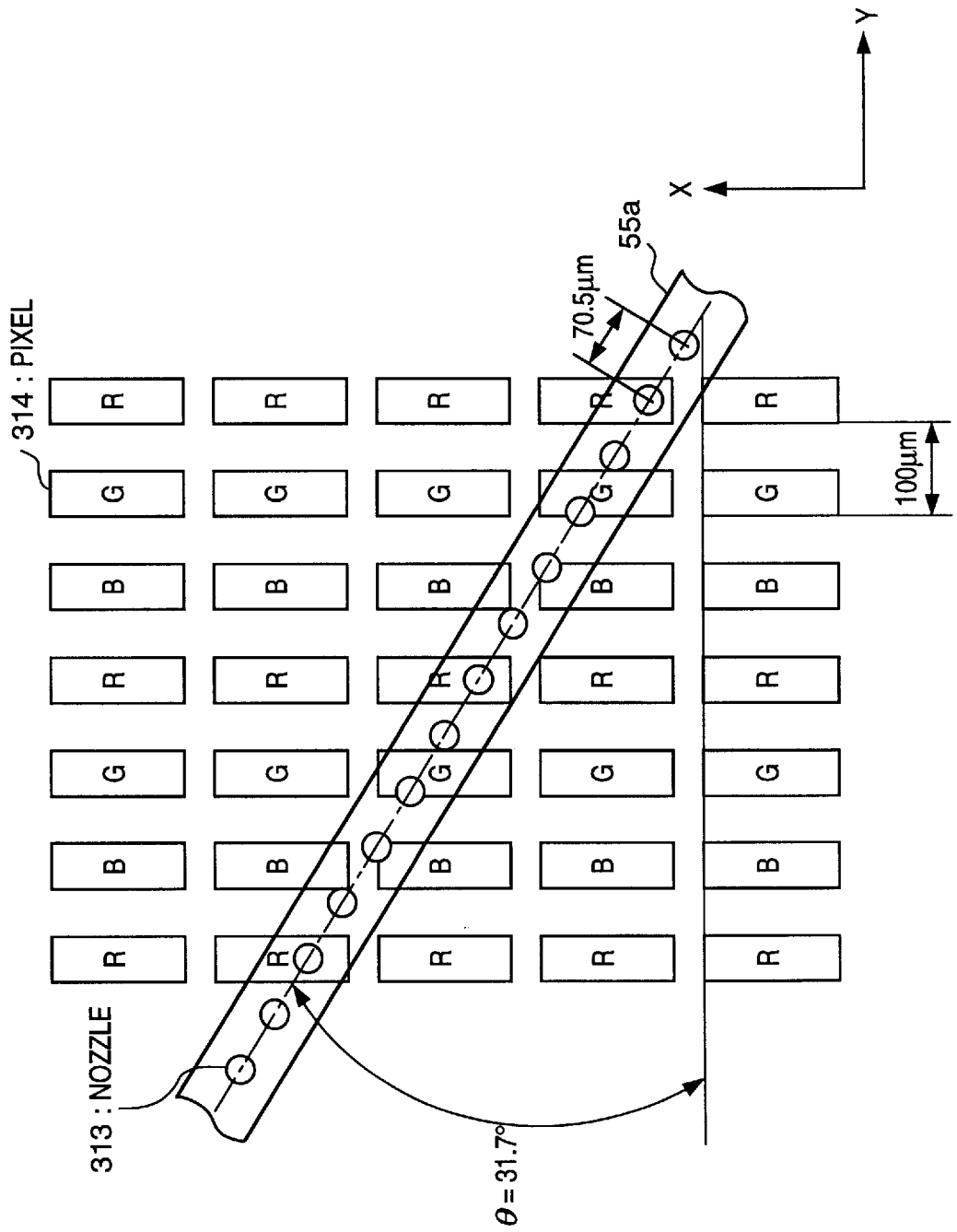

$y = y1 + y2$

INK-JET PRINTER AND PRINTING METHOD, AUXILIARY MEMBER, INK-JET HEAD, WARP CORRECTION METHOD, INK-JET HEAD UNIT AND COLOR-MIXTURE REDUCING METHOD

BACKGROUND OF THE INVENTION

This invention relates to ink-jet printer and printing method which perform printing by discharging ink from an ink-jet head onto a printing object, an auxiliary member, an ink-jet head, a warp correction method, an ink-jet head unit and color-mixture reducing method.

In recent years, there is an increasing need for liquid-crystal displays, and especially for color liquid-crystal displays, with development of personal computers, and especially handheld personal computers. However, it is necessary to reduce cost of the liquid-crystal displays so that the personal computers can be more widely used. Especially, it is required to reduce cost of the color filter which is considerably expensive. Conventionally, various methods have been practiced to meet the above requirements while satisfying the necessary characteristics of color filter, however, none of the methods satisfies all the necessary characteristics. The previous methods are as follows.

The first method is a pigment diffusion method. This method obtains a single-color pattern by forming a photosensitive resin layer where pigment is diffused on a substrate and followed by patterning of the resin layer. This process is repeated three times to form an R, G and B color filter layer.

The second method is a coloring method. This method obtains a colored pattern by coating water-soluble polymeric material, as coloring material, on a glass substrate, forming it into a desired pattern by photolithography process, and dipping the obtained pattern into a coloring bath. This process is repeated three times to form an R, G and B color filter layer.

The third method is an electrodeposition method. This method performs electrodeposition of a first color by forming a transparent electrode into a pattern on a substrate and dipping the electrode into an electrodeposition coating liquid including pigment, resin, electrolyte and the like. This process is repeated three times to form an R, G and B color filter layer, and finally, the color filter layer is sintered.

The fourth method is a printing method. This method forms a colored layer by diffusing pigment on a heat-setting type resin by printing three times for coloring R, G and B, and heating the resin to set.

Generally, a protective layer is formed on the colored layer in any of these methods.

The above methods repeat one process three times to color the three R, G and B colors, which increases cost. Further, as the number of processes is great, the yield is lowered. Further, the electrodeposition method, in which the formable pattern shape is limited, cannot be applied to a TFT (Thin Film Transistor) without difficulty by using the present technique. Further, the printing method with poor resolution and smoothness cannot be employed to form fine pitch patterns without difficulty.

To compensate these drawbacks, Japanese Patent Application Laid-Open Nos. 59-75205, 63-235901, and 1-217320 disclose manufacturing a color filter by using an ink-jet printing method. According to these conventional arts, ink including three R (red), G (green) and B (blue) color matters is discharged onto a light-transmitting type subject in accordance with an ink-jet method, and the respective color ink is dried to form colored image portion. The ink-jet method enables formation of R, G and B pixels in one process, thus greatly simplifies manufacturing process and greatly reduces cost.

A known ink-jet method is so-called bubble-jet method which causes film boiling by thermal energy to form a bubble and discharges ink by volume expansion of the bubble. In a case where the bubble-jet method is applied to an ink-jet head, the temperature of the ink-jet head increases due to the thermal energy. The temperature rise expands the ink-jet head, which may shift the positions of discharge nozzles for discharging ink. Recently, a long ink-jet head where a large number of nozzles are arrayed is employed, and the ink-jet head is scanned in a direction approximately orthogonal to a direction along the array of the nozzles for coloring a large number of pixel arrays at one scanning. The shift of the positions of the discharge nozzles due to expansion of the ink-jet head in its lengthwise direction is a serious problem.

Further, in the above long ink-jet head, it is difficult to manufacture a head such that a large number of nozzles, $\mu$m order apart, are arrayed in one line. Especially, when high-precision ink discharging is required as in manufacturing a color filter, it is very important to improve positional precision of the nozzles.

SUMMARY OF THE INVENTION

The present invention has been made in consideration of the above situation, and has its object to provide ink-jet printer and printing method which reduce temperature rise of an ink-jet head to the utmost, an auxiliary member, an ink-jet head and a warp correction method for the ink-jet head.

Further, another object of the present invention is to provide an ink-jet printer and printing method which array nozzles of a long ink-jet head in line with high precision, an auxiliary member, an ink-jet head and a warp correction method for the ink-jet head.

According to the present invention, the foregoing object is attained by providing an ink-jet printer which performs printing by discharging ink from an ink-jet head onto a printing object, comprising: a long ink-jet head having a plurality of ink-discharge nozzles arrayed in a lengthwise direction; and a plate-shaped auxiliary member attached to said ink-jet head along the lengthwise direction, said auxiliary member having a predetermined volume to increase the thermal capacity of said ink-jet head, and having a function to correct warp of said ink-jet head, wherein said auxiliary member has a plurality of warp correction portions provided at positions corresponding to different positions in the lengthwise direction of said ink-jet head.

Further, the foregoing object is attained by providing an ink-jet printing method for performing printing by discharging ink from an ink-jet head onto a printing object, comprising the step of scanning, relatively to said printing object, a long ink-jet head in which a plurality of ink-discharge nozzles arrayed in a lengthwise direction, and to which a plate auxiliary member is attached along the lengthwise direction, while performing printing by discharging ink from said ink-jet head, said auxiliary member having a predetermined volume to increase the thermal capacity of said ink-jet head, and having a plurality of warp correction portions provided at positions corresponding to different positions in the lengthwise direction of said ink-jet head.

Further, the foregoing object is attained by providing an auxiliary member attached to a long ink-jet head in which a plurality of ink-discharge nozzles are arrayed in a lengthwise direction, wherein said auxiliary member has a predetermined volume to increase the thermal capacity of said ink-jet head, and has a plurality of warp correction portions provided at positions corresponding to different positions in the lengthwise direction of said ink-jet head so as to correct warp of said ink-jet head.

According to an aspect of the present invention, the foregoing object is attained by providing a long ink-jet head in which a plurality of ink-discharge nozzles are arrayed in a lengthwise direction, integrally comprising an auxiliary member having a predetermined volume to increase the thermal capacity of said ink-jet head, and having a plurality of warp correction portions provided at positions corresponding to different positions in the lengthwise direction of said ink-jet head, so as to correct warp of said ink-jet head.

Further, the foregoing object is attained by providing a warp correction method for correcting warp of a long ink-jet head in which a plurality of ink-discharge nozzles are arrayed in a lengthwise direction, wherein said ink-jet head has first screw holes along the lengthwise direction, while said auxiliary member has second screw holes having a larger diameter than that of said first screw holes, at positions corresponding to the first screw holes, and wherein the warp of said ink-jet head is corrected by pulling said ink-jet head toward said auxiliary member by screw-inserting a screw which can be fit-inserted into said first screw hole via said second screw hole, while pushing said ink-jet head from said auxiliary member by screw-inserting a screw which can be fit-inserted into said second screw hole.

Further, according to another aspect of the present invention, the foregoing object is attained by providing a long ink-jet head in which a plurality of ink-discharge nozzles are arrayed in a lengthwise direction, used in a method for manufacturing a color filter by scanning said ink-jet head relatively to a coloring object while performing printing by discharging ink from said ink-jet head, wherein a pixel width GL of one pixel of said color filter, an ink dot diameter CL, a slant angle θ of said ink-jet head in a direction orthogonal to a scanning direction, and a nozzle shift width y in an direction orthogonal to an ideal straight line where the plurality of ink-discharge nozzles are arrayed if said ink-jet head is not warped, are set to satisfy $y \leq (GL-CL)/\sin\theta$ $(0°<\theta<90°)$.

Further, the foregoing object is attained by providing an ink-jet head unit having a plurality of long ink-jet heads each having a plurality of ink-discharge nozzles arrayed in a lengthwise direction, used in a method for manufacturing a color filter by scanning said ink-jet head relatively to a coloring object while performing printing by discharging ink from said ink-jet head, wherein a pixel width GL of one pixel of said color filter, an ink dot diameter CL, a slant angle θ of said ink-jet head in a direction orthogonal to a scanning direction, and a nozzle shift width y in an direction orthogonal to an ideal straight line where the plurality of ink-discharge nozzles are arrayed if said ink-jet head is not warped, are set to satisfy $y \leq (GL-CL)/\sin\theta$ $(0°<\theta<90°)$.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a cross-sectional view showing the basic structure of a color liquid-crystal display device having a color filter of the embodiment;

FIG. 6 is a cross-sectional view showing another example of the basic structure of a color liquid-crystal display device having the color filter of the embodiment;

FIG. 7 is an explanatory view showing an example of coloring the color filter;

DETAILED DESCRIPTION OF THE PREFERRED EMBODIMENTS

Preferred embodiments of the present invention will now be described in detail in accordance with the accompanying drawings.

Figure 1:
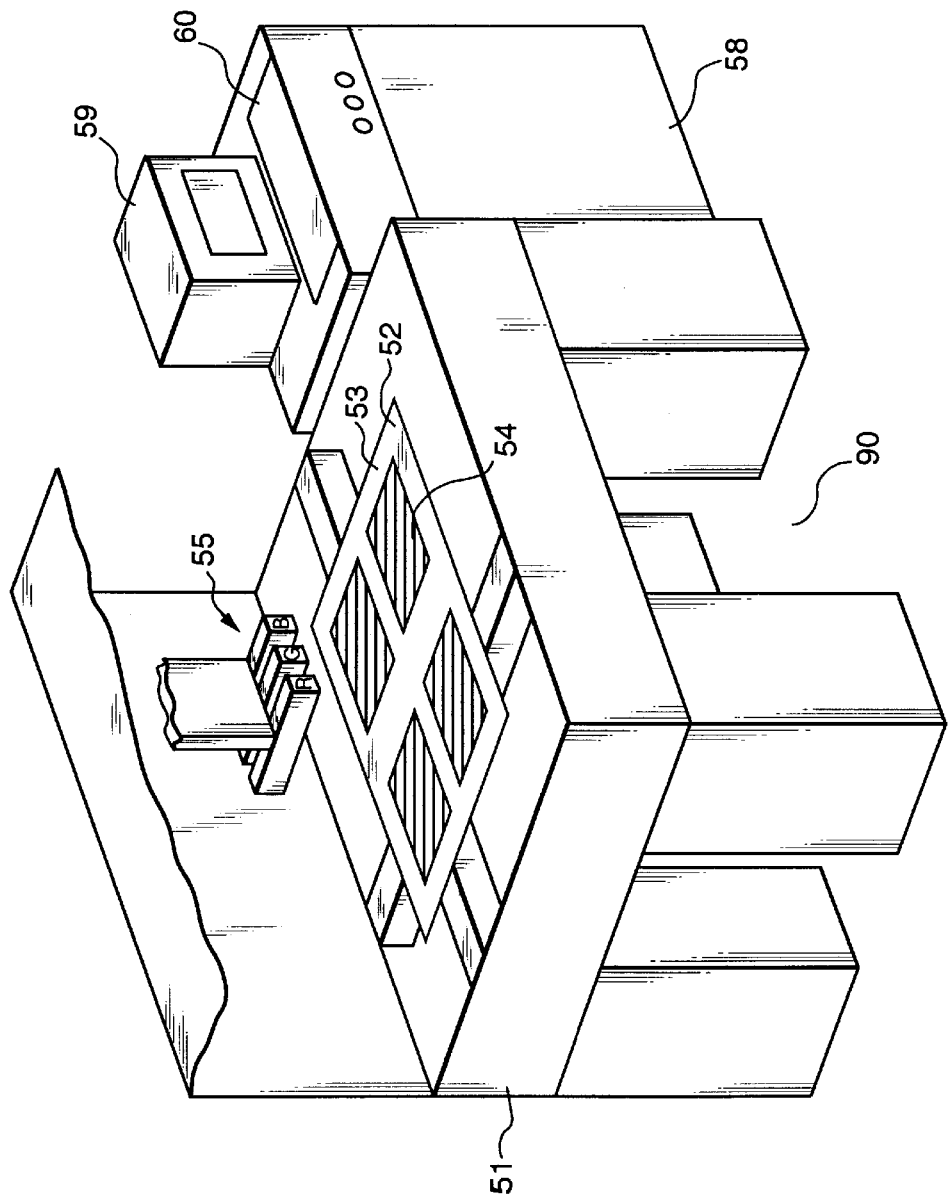
FIG. 1 is a perspective view showing the structure of a color-filter manufacturing apparatus according to an embodiment of the present invention.

FIG. 1 is a perspective view showing the structure of a color-filter manufacturing apparatus according to an embodiment of the present invention.

In FIG. 1, reference numeral 51 denotes a platform of the apparatus; 52, an XYθ stage provided on the platform 51; 53, a color-filter substrate set on the XYθ stage 52; 54, a color filter formed on the color-filter substrate 53; 55, R (red), G (green) and B (blue) ink-jet heads for coloring the color filter 54; 58, a controller which controls the overall operation of a color-filter manufacturing apparatus 90; 59, a teaching pendant (personal computer) as a display unit of the controller 58; and 60, a keyboard as an operation unit of the teaching pendant 59.

Figure 2:
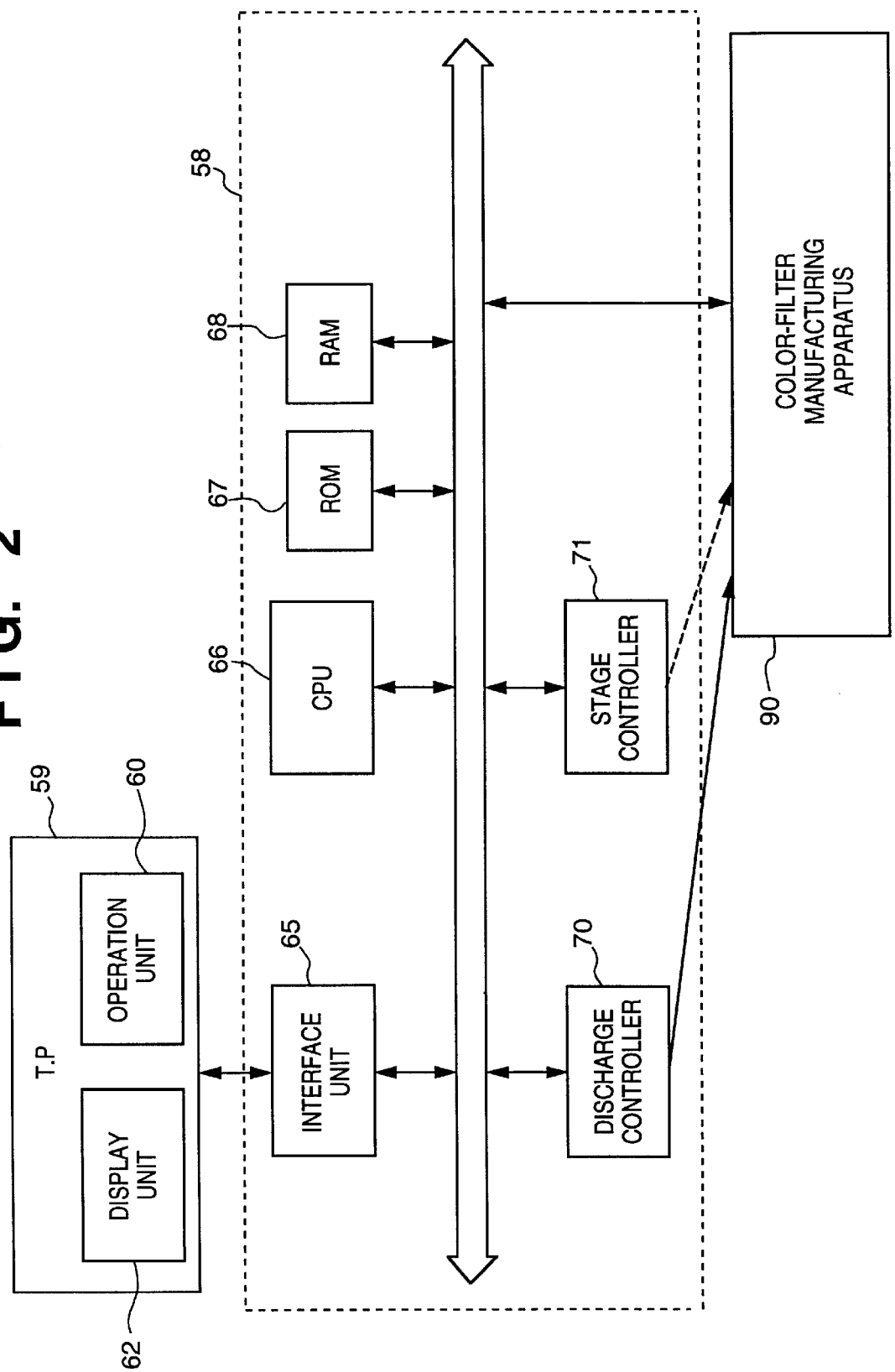
FIG. 2 is a block diagram showing the construction of a controller which controls the operation of the color-filter manufacturing apparatus.

FIG. 2 is a block diagram showing the construction of a controller which controls the operation of the color-filter manufacturing apparatus 90. In FIG. 2, the teaching pendant 59 serves as input/output means of the controller 58. Numeral 62 denotes a display unit which displays information on the progress of manufacturing process, presence/absence of abnormality of the ink-jet head and the like. The keyboard 60 serves as an operation unit for instructing the operation and the like of the color-filter manufacturing apparatus 90.

The controller 58 controls the overall operation of the color-filter manufacturing apparatus 90; 65, an interface unit for receiving/sending data with respect to the teaching pendant 59; 66, a CPU which controls the color-filter manufacturing apparatus 90; 67, a ROM in which control programs for operating the CPU 66 are stored; 68, a RAM in which production information and the like are stored; 70, a discharge controller which controls ink discharge to respective pixels of a color filter; 71, a stage controller which controls the operation of the XYθ stage 52. The color-filter manufacturing apparatus 90 is connected to the controller 58, and operates in accordance with instructions from the controller 58.

Figure 3:
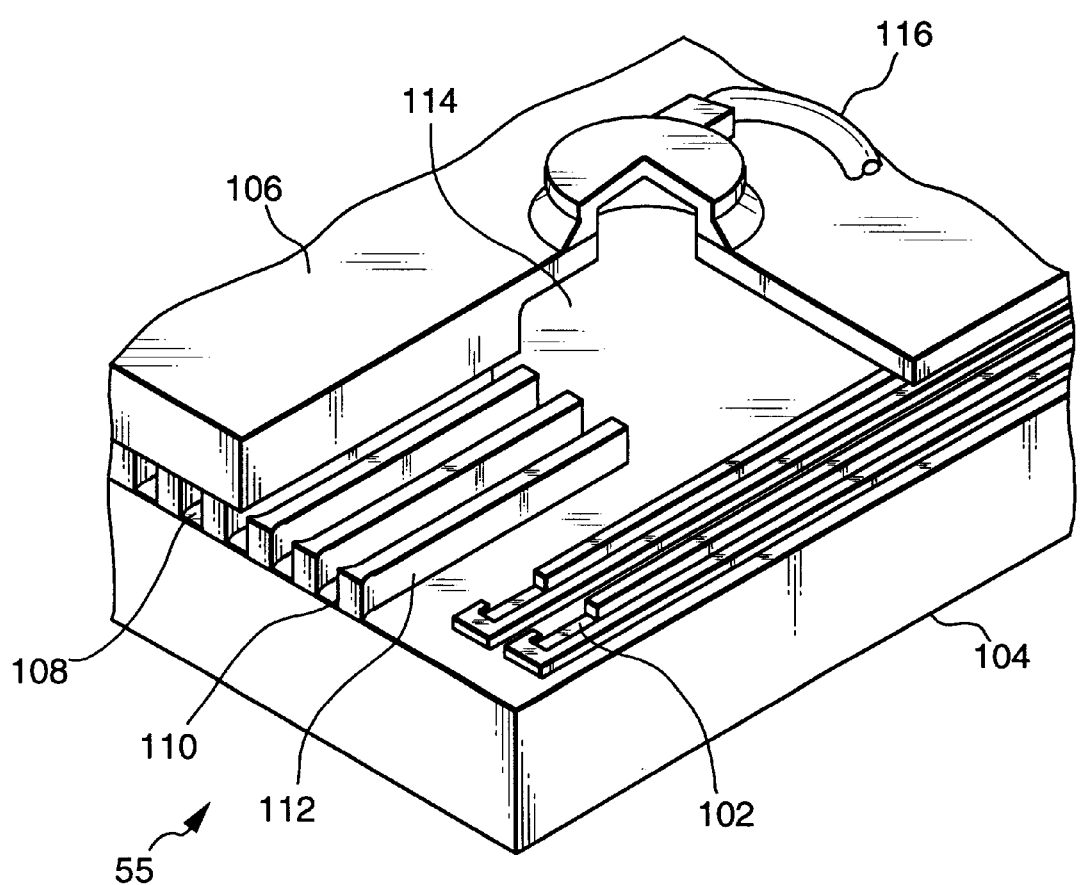
FIG. 3 is a perspective view showing the structure of an ink-jet head used in the color-filter manufacturing apparatus.

FIG. 3 is a perspective view showing the structure of the ink-jet head 55 used in the above color-filter manufacturing apparatus 90. In FIG. 1, the three ink-jet heads are provided in correspondence with the three, R, G and B colors, however, as the three heads have the same structure, FIG. 3 shows the structure of one of these heads.

In FIG. 3, the ink-jet head 55 mainly comprises a heater board 104 as a base plate, a plurality of heaters 102 formed on the heater board 104, and a top plate 106 placed on the heater board 104. A plurality of discharge orifices 108 are formed on the top plate 106, and tunnel-like liquid channels 110 connected to the discharge orifices 108 are formed at the rear of the discharge orifices 108. The respective liquid channels 110 are separated from each other by partition walls 112. The liquid channels 110 are connected to a common ink chamber 114 at the rear of the liquid channels. Ink is supplied to the ink chamber 114 via an ink supply orifice 116, and the ink is supplied from the ink chamber 114 to the respective liquid channels 110.

The heater board 104 and the top plate 106 are assembled such that the respective heaters 102 are positioned corresponding to the respective liquid channels 110, as shown in FIG. 3. Although FIG. 3 only shows two heaters 102, the heaters 102 are respectively provided in correspondence with the respective liquid channels 110. In the assembled state as shown in FIG. 3, when a predetermined drive pulse is applied to the heaters 102, the ink on the heaters 102 is boiled to form bubbles, and the ink is pressed due to volume expansion of the bubbles and discharged from the discharge orifices 108. Accordingly, the size of the bubbles can be controlled by controlling the drive pulse, e.g., the level of electric power, applied to the heaters 102. Thus, the volume of the ink discharged from the discharge orifices can be freely controlled.

In the present embodiment, the substrate 1 is a glass substrate, however, the substrate 1 is not limited to the glass substrate as long as the substrate has necessary characteristics for a liquid-crystal color filter such as transparency, mechanical strength and the like.

FIGS. 4A to 4F are cross-sectional views showing an example of a color-filter manufacturing process.

Figure 4A:
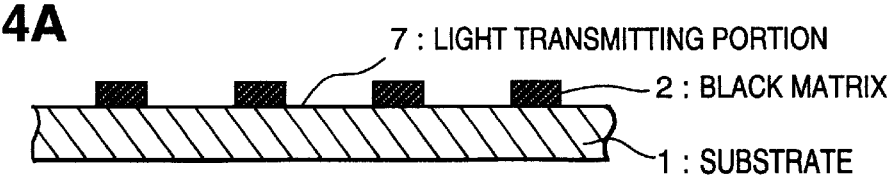
FIGS. 4A to 4F are cross-sectional views showing an example of a color-filter manufacturing process.
Figure 4B:
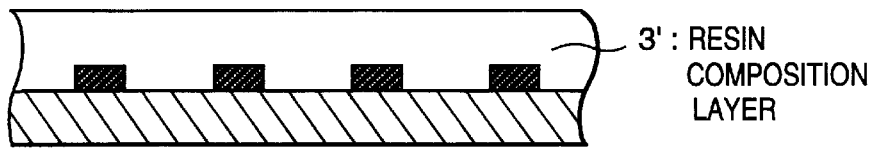

FIG. 4A shows the glass substrate 1 having a light transmitting portion 7 and a black matrix 2 as a light shielding portion. First, resin composition, which is set by irradiation of light or a combination of irradiation of light and heating, and which has ink acceptability, is coated on the substrate 1 on which the black matrix 2 is formed, and prebaking is performed in accordance with necessity to form a resin layer 3' (FIG. 4B).

The resin layer 3' can be formed by various coating methods such as spin coating, roll coating, bar coating, spray coating and dip coating, and the formation of the resin layer 3' is not limited to any specific method.

Figure 4C:
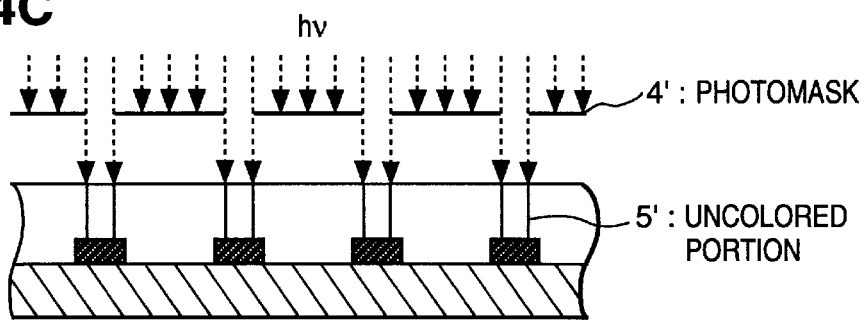
Figure 4D:
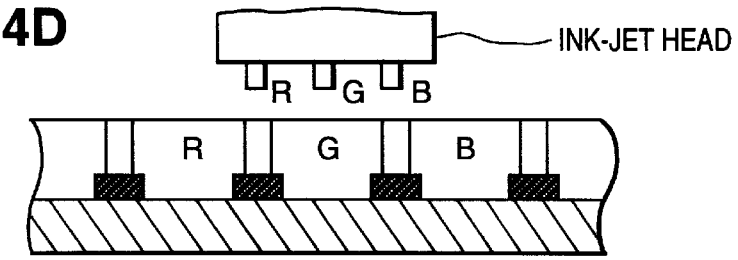
Figure 4E:
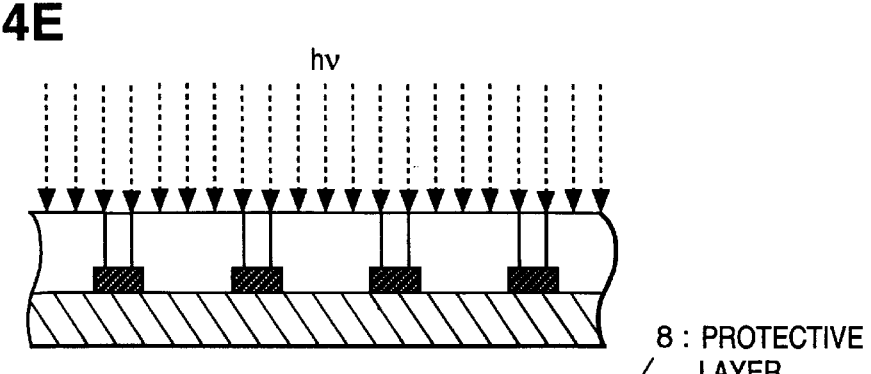

Next, a part of the resin layer 3' is set to form a uncolored portion (portion which does not absorb ink) 5' by performing pattern exposure on the resin layer in advance at a portion light-shielded by the black matrix 2 (FIG. 4C). Then, the resin layer 3' is colored respective R, G and B colors by using the ink-jet head (FIG. 4D), and the ink is dried in accordance with necessity.

In the pattern exposure, a photomask 4' having openings for curing the light-shielded portions by the black matrix 2 is employed. At this time, to prevent occurrence of uncolored portion at a portion which abuts on the black matrix 2, it is necessary to apply a relatively large amount of ink to such portion. For this purpose, the photomask 4' have openings greater than the width (light-shielding width) of the black matrix 2.

As the ink used for coloring, dyes and pigments are both available, and further, both liquid ink and solid ink are both available.

As resin composition employed in the present invention, any composition can be used as long as it has ink acceptability, and it can be set by at least one of irradiation of light and heating. For example, resins such as acrylic resins, epoxy resins, silicone resins, cellulose derivatives such as hydroxypropyl cellulose, hydroxyethyl cellulose, methylcellulose, carboxymethyl cellulose or degenerated materials thereof can be employed.

To promote cross-linking reaction by light or light and heat, a photo initiator (cross linking agent) can be employed. As the cross linking agent, bichromate, bisazide, radical initiator, cationic initiator, anionic initiator and the like can be employed. Further, these photo initiators can be mixed or they can be combined with other sensitizers. To further promote the cross-linking reaction, heating processing can be performed after irradiation of light.

The resin layer including the above compositions has excellent thermal resistance and water resistance so as to sufficiently endure high temperature postprocess or cleaning process.

As the ink-jet method used in the present invention is a bubble-jet type method using electrothermal transducer as an energy generating element can be employed. The size of colored area and the coloring pattern can be arbitrarily set.

Figure 4F:
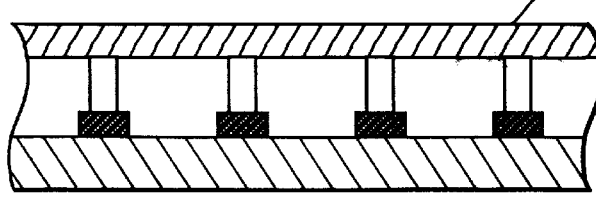

Next, the resin composition is set by only irradiation of light, only heating processing, or irradiation of light and heating processing (FIG. 4E), and a protective layer 8 is formed in accordance with necessity (FIG. 4F). Note that in FIGS. 4A to 4F, sign hv denotes the intensity of light. In case of heating processing, the resin layer is set by heat instead of light of the intensity hv. The protective layer 8 is formed by using a second resin composition of photo-setting type, heat-setting type or photo- and heat-setting type, or by vapor deposition or sputtering using inorganic material. Any material can be used to form the protective layer 8 as long as it has transparency and sufficient durability at ITO formation process, orientation film formation process and the like performed thereafter.

Further, in this example, the resin composition is formed on the substrate, however, it may be arranged such that ink is directly applied to the substrate.

That is, R, G and B ink is applied such that the light-transmitting portions between the black matrix can be colored in the respective R, G and B colors, by utilizing the ink-jet method. The R, G and B pattern may be formed in so-called casting. Further, it is preferable that the respective colors are printed within ranges such that they do not overlap with each other.

The ink used in the coloring, dyes and pigments are both available, further, liquid ink and solid ink are both available. Note that the ink must contain photo-setting component, heat-setting component or component curable by light and heat, such as various resins and setting agents on the market, and the this component is not limited to any specific type of component unless it solidifies in the ink. For example, acrylic resins, epoxy resins, melamine resins and the like are preferably used.

FIGS. 5 and 6 are cross-sectional views showing the basic structure of a color liquid-crystal display device 30 using the above color filter.

Generally, the color liquid-crystal display device is formed by assembling the color filter substrate 1 and an opposite substrate 21 and filling liquid-crystal compound 18 between them. On the inner surface of the substrate 21, a TFT (not shown) and transparent pixel electrodes are formed in matrix. On the inner surface of the substrate 1, the color filter 54 is provided such that the R, G and B colored portions can be positioned corresponding to each of the pixel electrodes. A transparent common electrode 16 is formed on the entire surface of the color filter 54. Generally, the black matrix 2 is formed on the color filter substrate 1 side (See FIG. 5), however, in a black-matrix on-array type liquid-crystal panel, the black matrix 2 is formed on the opposite TFT side (See FIG. 6). Further, an orientation film 19 is formed on the surfaces of the both substrates 1 and 21. Liquid-crystal molecules can be oriented in a predetermined direction by rubbing processing on the orientation film 19. Further, polarizing plates 11 and 22 are attached to the outer surfaces of the respective glass substrates. The liquid-crystal compound 18 is filled in the interval (about 2 to 5 $\mu$m) between these glass substrates. As backlight, the combination of a fluorescent light (not shown) and a light-scattering plate (not shown) is generally used. The liquid-crystal compound functions as an optical shutter to change transmittance of the backlight, which realizes display.

Next, a color-filter coloring process according to the manufacturing method of the present embodiment will be described.

First, the glass substrate 53 is set on the XYθ stage 52 of the color-filter manufacturing apparatus 90, and alignment is performed. Then, a color-filter formation area (colored area) of the glass substrate 53 is moved to a position directly below the ink-jet head 55. The ink-jet head 55 and the glass substrate 53 are relatively scanned with each other while ink is discharged, thus the respective pixels of the color filter are colored.

FIG. 7 shows the relation between a head 55a discharging red (R) ink in the ink-jet head 55 and the glass substrate 53.

In FIG. 7, the head 55a has nozzles 313 arrayed at intervals of 70.5 $\mu$m. When the head 55a is used for coloring a color filter having R, G and B pixels 314 arranged in this R→G→B order at intervals of, e.g., 100 $\mu$m, the position of the nozzles must be aligned with the red pixels arrayed at intervals of 300 $\mu$m. For this purpose, the nozzles of the head 55a are used at every 5th nozzle, and the head 55a is tilted at an angle of 31.70 with respect to the scanning direction. Then, every 5th nozzles are positioned directly above the red pixels, thus coloring is performed precisely. This relation is also applied to other heads 55b and 55c.

Figure 8:
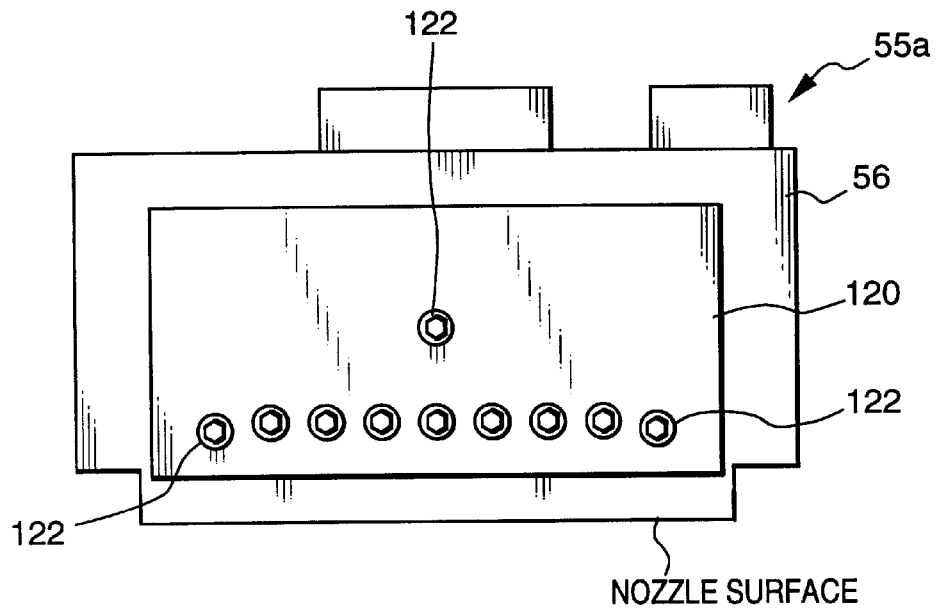
FIG. 8 is a view showing the ink-jet head to which a plate is attached.
Figure 9:
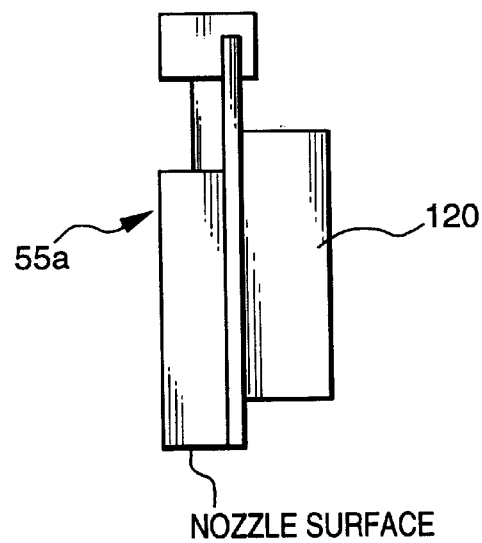
FIG. 9 is a cross-sectional view showing the ink-jet head in FIG. 8 viewed from the left-hand of the ink-jet head.

FIG. 8 is a schematic view showing a construction to suppress the temperature rise of the ink-jet head which is a characteristic part of the present embodiment. FIG. 9 is a cross-sectional view showing the ink-jet head in FIG. 8 viewed from the left-hand of the ink-jet head. Note that description will be made on only the ink-jet head 55a to discharge red ink, however, the other heads 55b and 55c have the same construction.

The ink-jet head 55a uses so-called bubble-jet method which forms a bubble in ink by thermal energy and expands the bubble to discharge ink. In this method, the temperature of the ink-jet head increases due to the generation of thermal energy. The temperature rise causes thermal expansion of the ink-jet head which changes the distance between the nozzles. In this embodiment, the temperature of the ink-jet head 55a increases by about 5° C. when it continuously discharges ink. The ink-jet head 55a has an aluminum alloy main body with a length of about 100 mm. When this temperature rise of 5° C. occurs, the distance between the nozzles is lengthened to about 10 $\mu$m. If the positions of the nozzles change by 10 $\mu$m respectively, the red pixel color mixes with adjacent pixel color in coloring processing on the color filter. To prevent the occurrence of color mixture, the positional shift of the nozzles must be reduced to about 3 $\mu$m or less.

As shown in FIGS. 7 and 8, in the present embodiment, a plate 120 having a thermal capacity two to four times of that of the ink-jet head 55a is attached to the rear surface of the ink-jet head 55a, so that the thermal capacity of the ink-jet head and that of the plate, as a total thermal capacity, can be three to five times of that of the ink-jet head 55a. In this arrangement, the temperature rise of the ink-jet head is reduced by ⅓ to ⅕, which reduces the distance between the nozzles in the lengthwise direction of the ink-jet head to about 2 $\mu$m to 3 $\mu$m. Thus, an ink-jet head which performs coloring without causing color mixture can be provided. Note that the material of the plate 120 is preferably an aluminum alloy or stainless steel since such material can be easily processed with low cost.

Figure 10:
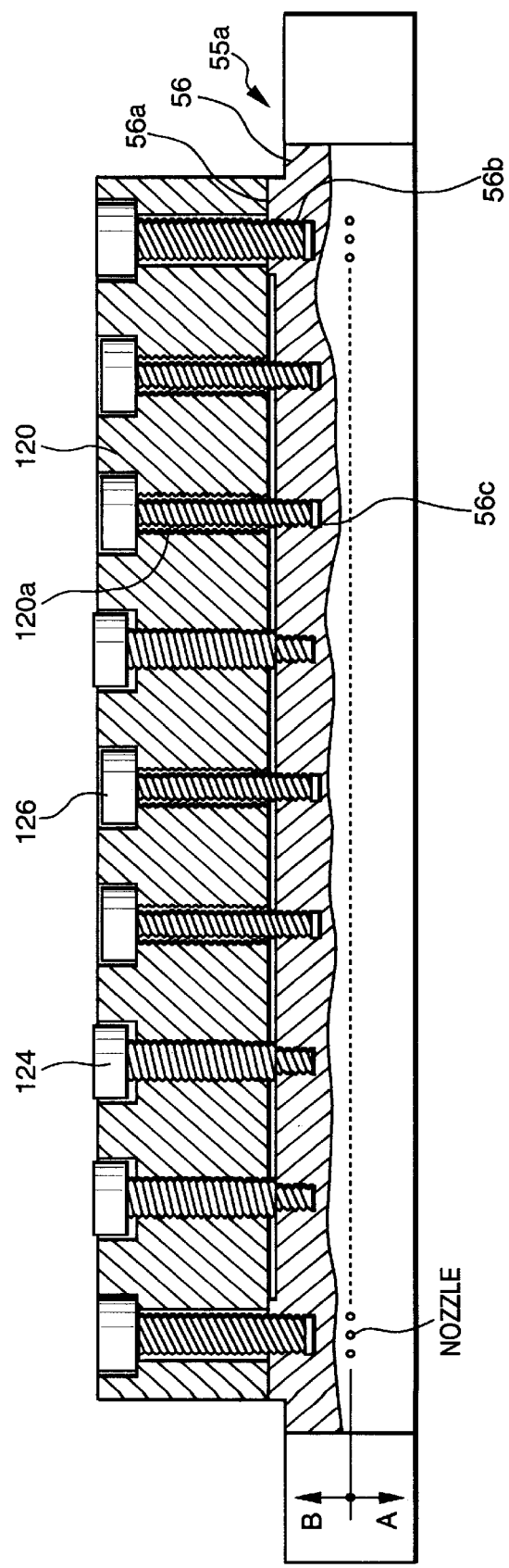
FIG. 10 is a partial cross-sectional view showing the ink-jet head in FIG. 8 viewed from the bottom of the ink-jet head.

FIG. 10 is a partial cross-sectional view showing the ink-jet head in FIG. 8 viewed from the bottom of the ink-jet head. The plate 120 used in the present embodiment has a function to correct warp of the ink-jet head 55a. The structure to correct the warp will be described with reference to FIGS. 8 and 10.

In FIGS. 8 and 10, the plate 120 is fixed by three bolts 122 to a head main body 56 of the ink-jet head 55a. A plane 56a, having a height slightly higher than other portions of the main body 56, is formed around female screws 56b which engage with the three bolts 122 of the head main body 56. The plate 120 is fixed onto the upper surface of the plane 56a.

On the plate 120, a plurality of screw holes 120a are formed at the central portion among the bolts 122. The screw holes 120a are M4 screw holes, for example, through which two types of bolts 124 and 126 are inserted. The ink-jet head 55a has a plurality of screw holes (female screws) 56c having smaller diameter (e.g., M3), at positions corresponding to the screw holes 120a. The bolt 124 is fit-screwed in the screw hole 120a. To move the head main body 56 away from the plate 120, the bolt 124 is screw-inserted into the screw hole 120a and the distal end of the bolt 124 is brought in contact with the surface of the head main body 56, to push the head main body 56. This shifts the nozzle in the arrow A direction in FIG. 10. The bolt 126 is a M3 bolt, for example, which can be freely inserted through the screw hole 120a with a gap between them, and fit-screwed into the smaller-diameter screw hole 56c of the ink-jet head 55a. To draw the head main body 56 toward the plate 120, the bolt 126 is screw-inserted into the M3 screw hole 56c. This shifts the nozzle in the arrow B direction in FIG. 10. In this manner, the position of the nozzle at a screw hole can be shifted in the arrow A or B direction by selectively inserting the bolt 124 that is just fit-screwed into the screw hole 120a and the bolt 126 that is freely inserted through the screw hole 120a and fit-screwed in the screw hole 56c. Thus, a slight warp of the ink-jet head 55a when it has been manufactured can be arbitrarily corrected.

Figure 11A:
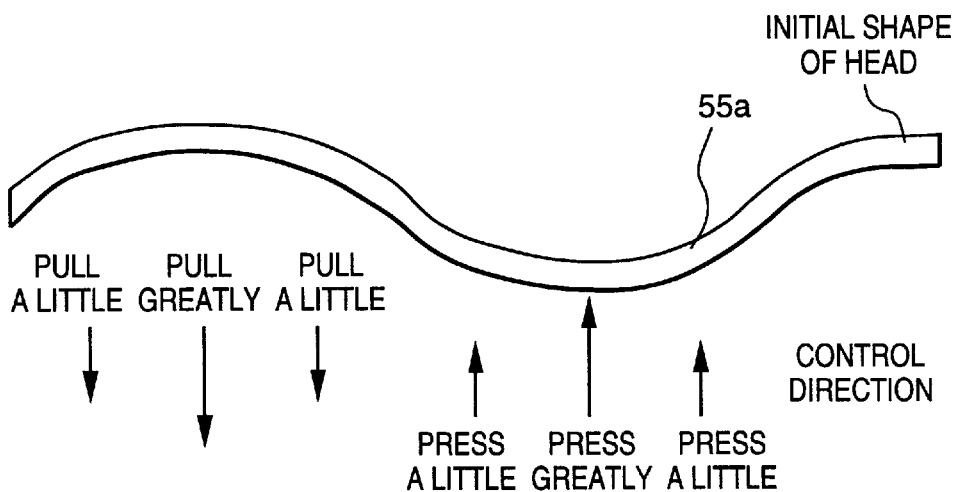
FIGS. 11A and 11B are explanatory views showing warp correction on the ink-jet head.
Figure 11B:
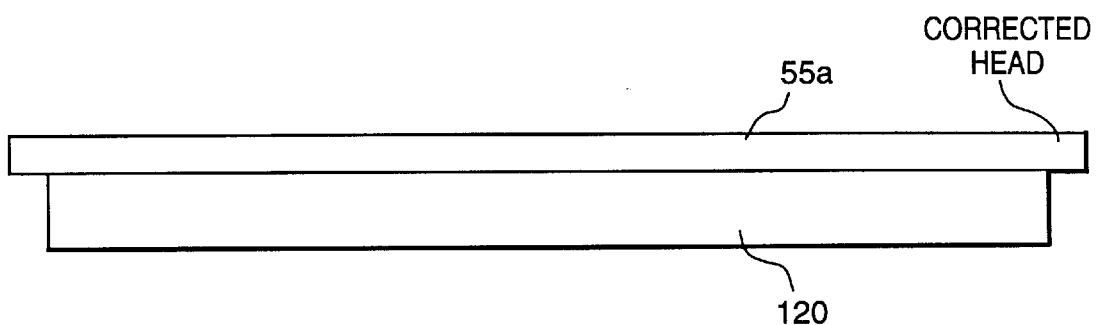

FIGS. 11A and 11B are explanatory views showing correcting warp of the ink-jet head.

As shown in FIG. 11A, the ink-jet head 55a has a slight warp when it has been manufactured (In FIG. 11A, the warp is exaggerated). This warp is corrected by pushing/drawing the ink-jet head with respect to the plate 120 while selectively using the bolts 124 and 126 as shown in FIG. 10. At this time, as shown in FIG. 11A, operations of pulling a little, pulling greatly, pushing a little, pushing greatly and the like, are combined in accordance with the degree of the warp, to correct the shape of the ink-jet head to a straight shape as shown in FIG. 11B.

Figure 12:
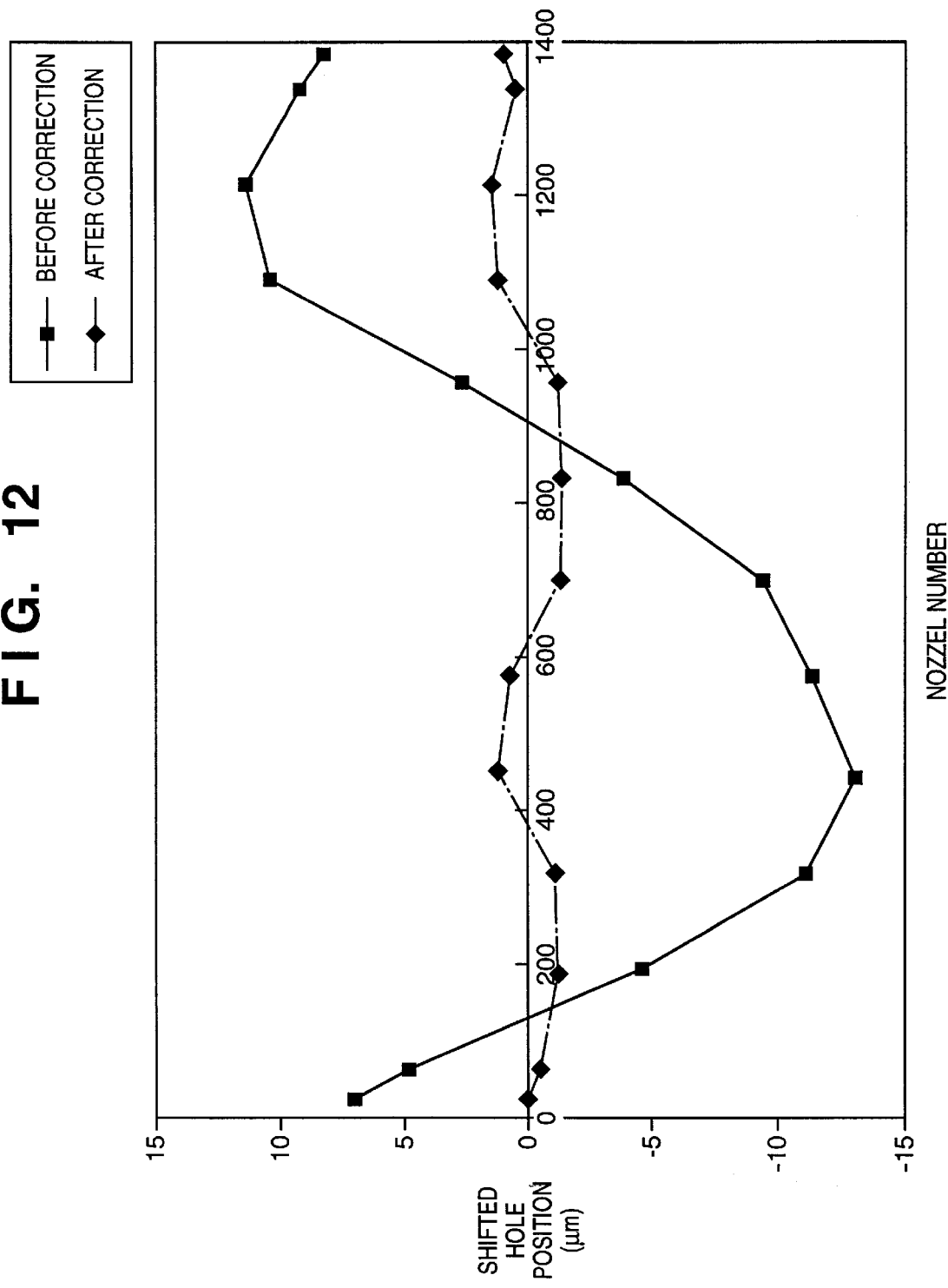
FIG. 12 is a graph showing the amount of warp of the ink-jet head before correction and that after the correction.

This correction reduces the warp of $\pm 10$ $\mu$m or greater, as represented by a solid line in FIG. 12, when the ink-jet head has been manufactured, to a slight warp of $\pm 2$ $\mu$m as represented by an alternate long and short dashed line in FIG. 12.

Figure 13:
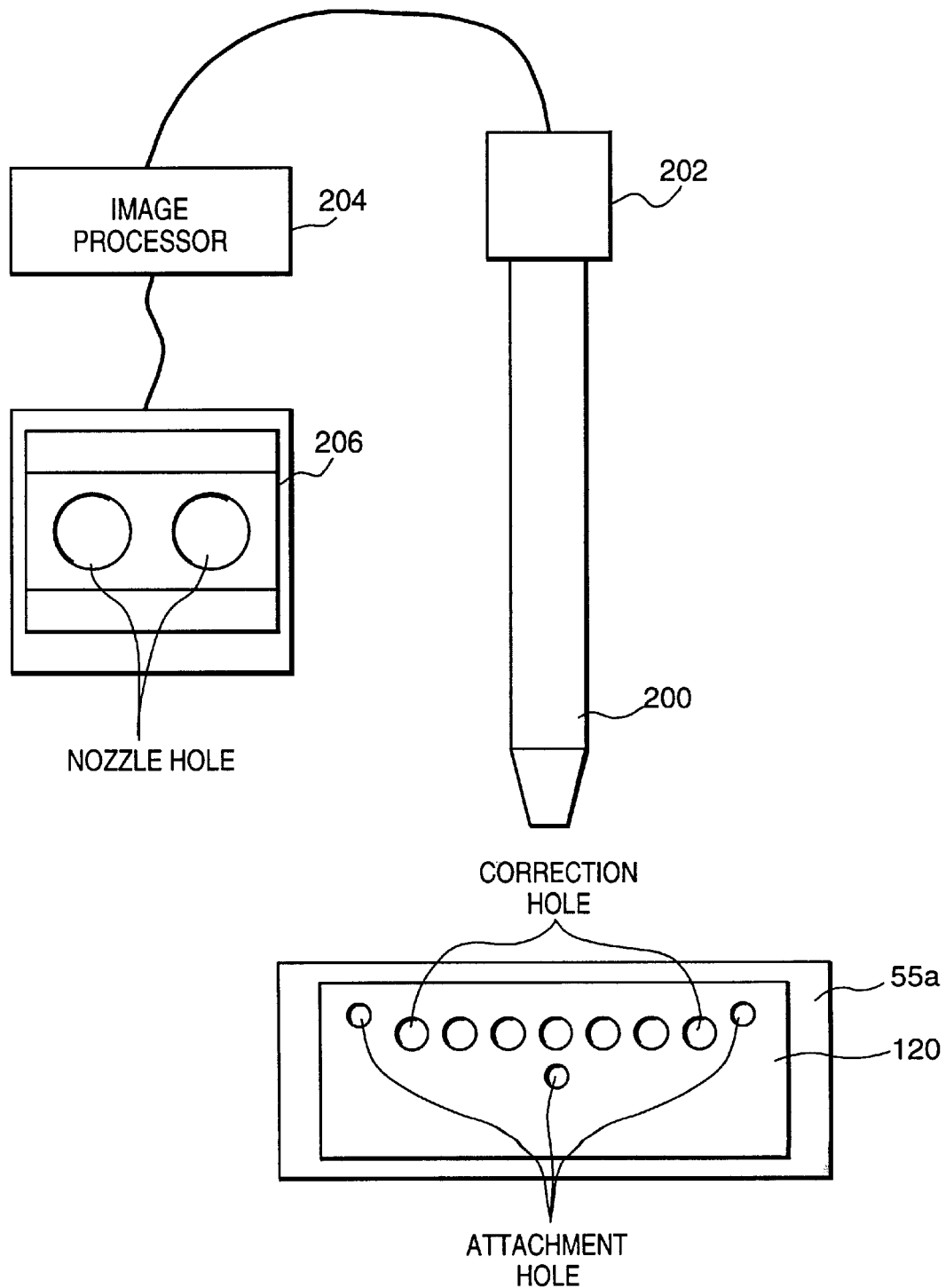
FIG. 13 is a view showing the construction of an apparatus for observing the warp of the ink-jet head.

Upon correction, a TV camera 202 image-senses nozzle holes of the ink-jet head 55a, via a microscope 200, and a monitor 206 displays the obtained enlarged image of the nozzle holes via an image processor 204, as shown in FIG. 13. The correction is performed while the positions of the nozzle holes are observed.

In this manner, the slight warp of the ink-jet head when it has been manufactured can be corrected, so that the nozzles are arrayed, with very minute positional shift of about $\pm 2$ $\mu$m, on a straight line.

Figure 14:
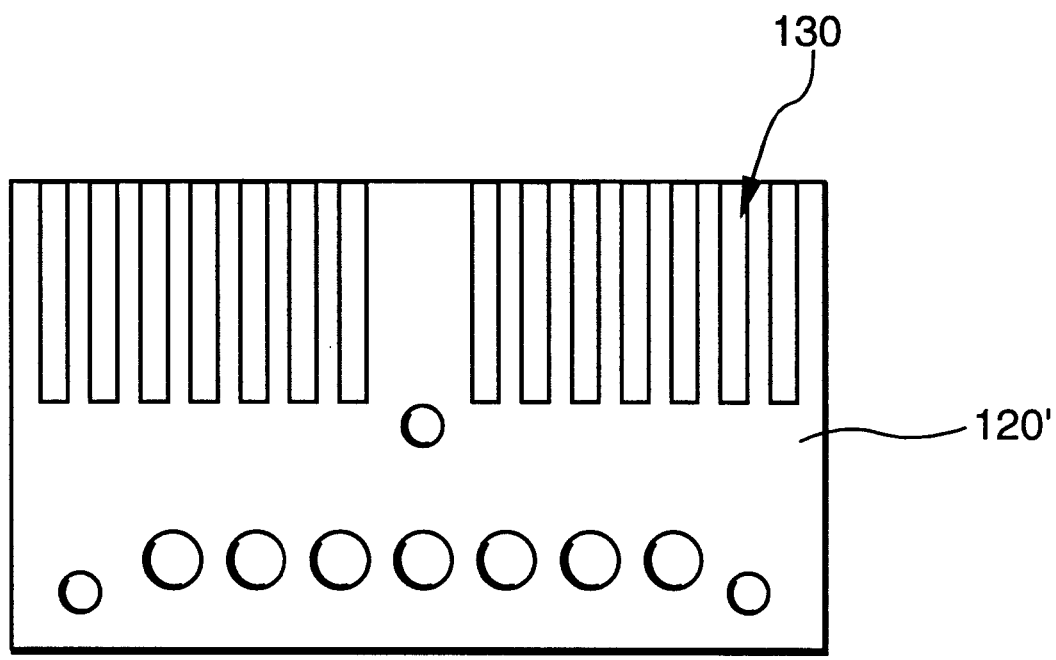
FIG. 14 is a view showing a modification of the plate.

Note that FIG. 14 shows a modification of the plate. As shown in FIG. 14, heat radiation can be improved and the temperature rise of the ink-jet head can be further suppressed by forming a fin 130 on a plate 120'.

Further, if the plate is colored black, the heat radiation can be improved, and the temperature rise of the ink-jet head can be more effectively suppressed.

Next, the precision of warp correction will be described in a case where a color filter is manufactured by discharging ink from the ink-jet head onto the glass substrate while the ink-jet head is scanned relatively to the glass substrate.

When manufacturing a color filter by an ink-jet printing, color mixture of colored adjacent pixels, which is characteristic of the ink-jet method is a serious problem.

Figure 15:
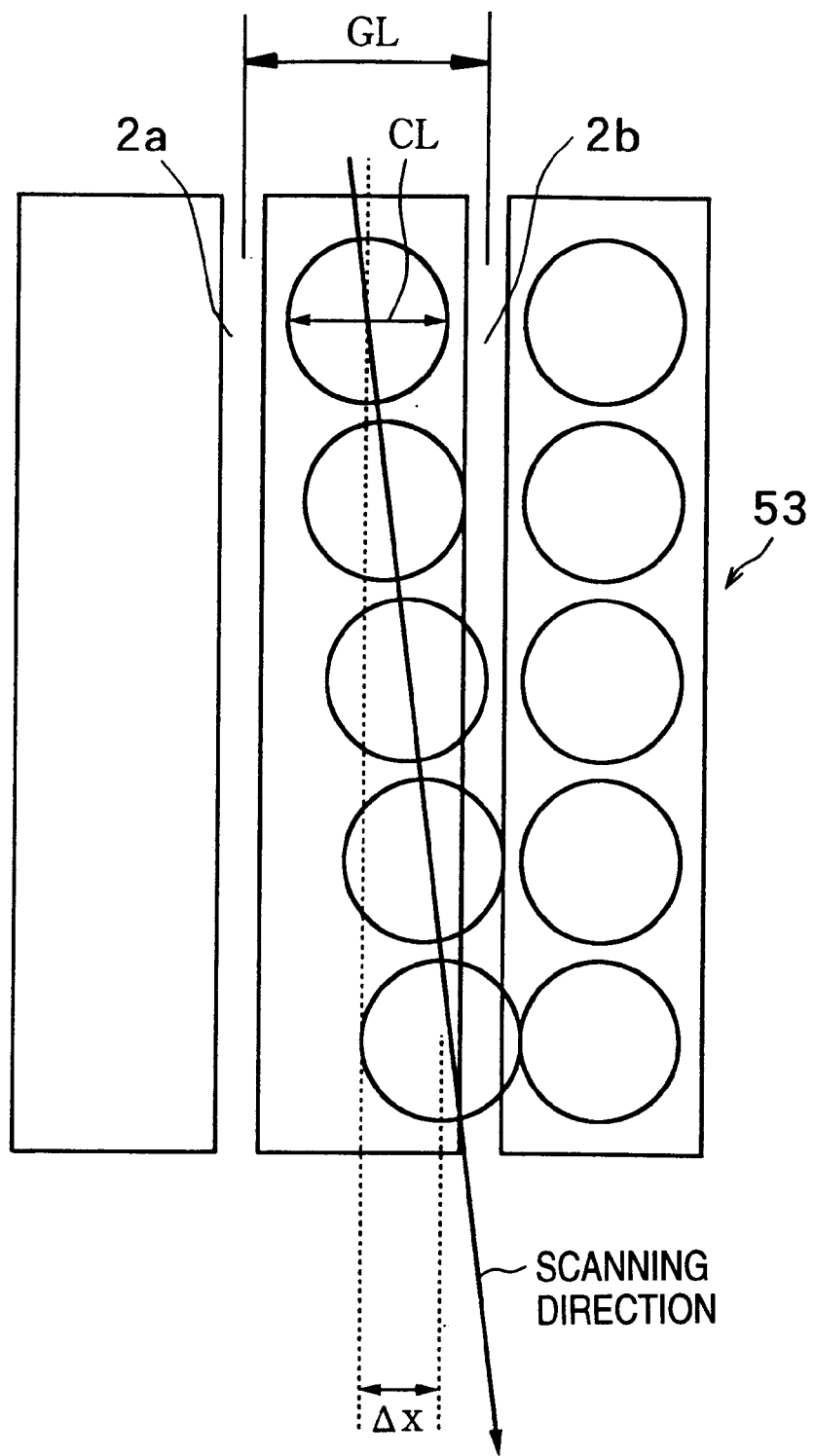
FIG. 15 is an explanatory view for obtaining an amount of offset of an ink dot which causes mixture of colors.

To clarify the cause of the color mixture, the present inventor had an experiment as shown in FIG. 15. That is, the glass substrate 53 is moved such that the ink-jet head is scanned in a slanted direction with respect to a pixel lengthwise direction while ink is discharged, to examine the relation among an ink-dot shift amount ($\Delta x$) at the beginning of color mixture, an ink-dot diameter CL, and a pixel width GL.

Ink discharge from a plurality of nozzles is repeated by changing discharge amount, i.e., the diameter of ink-dot when attached onto the substrate, and changing the pixel width GL (distance between the centers of adjacent black matrices 2a and 2b in FIG. 15). Then it is found that the occurrence of color mixture abruptly increases when the following relation is satisfied:

$$GL < CL + \Delta x$$

In other words, there is a little possibility of color mixture when the following relation is satisfied:

$$\Delta x \leq GL - CL$$

It is known that in manufacturing a color filter, when pixels are at different pitches, coloring can be performed without problem by slanting the ink-jet head as shown in FIG. 7. This enables the ink-jet head to color various types of color filters.

Figure 16:
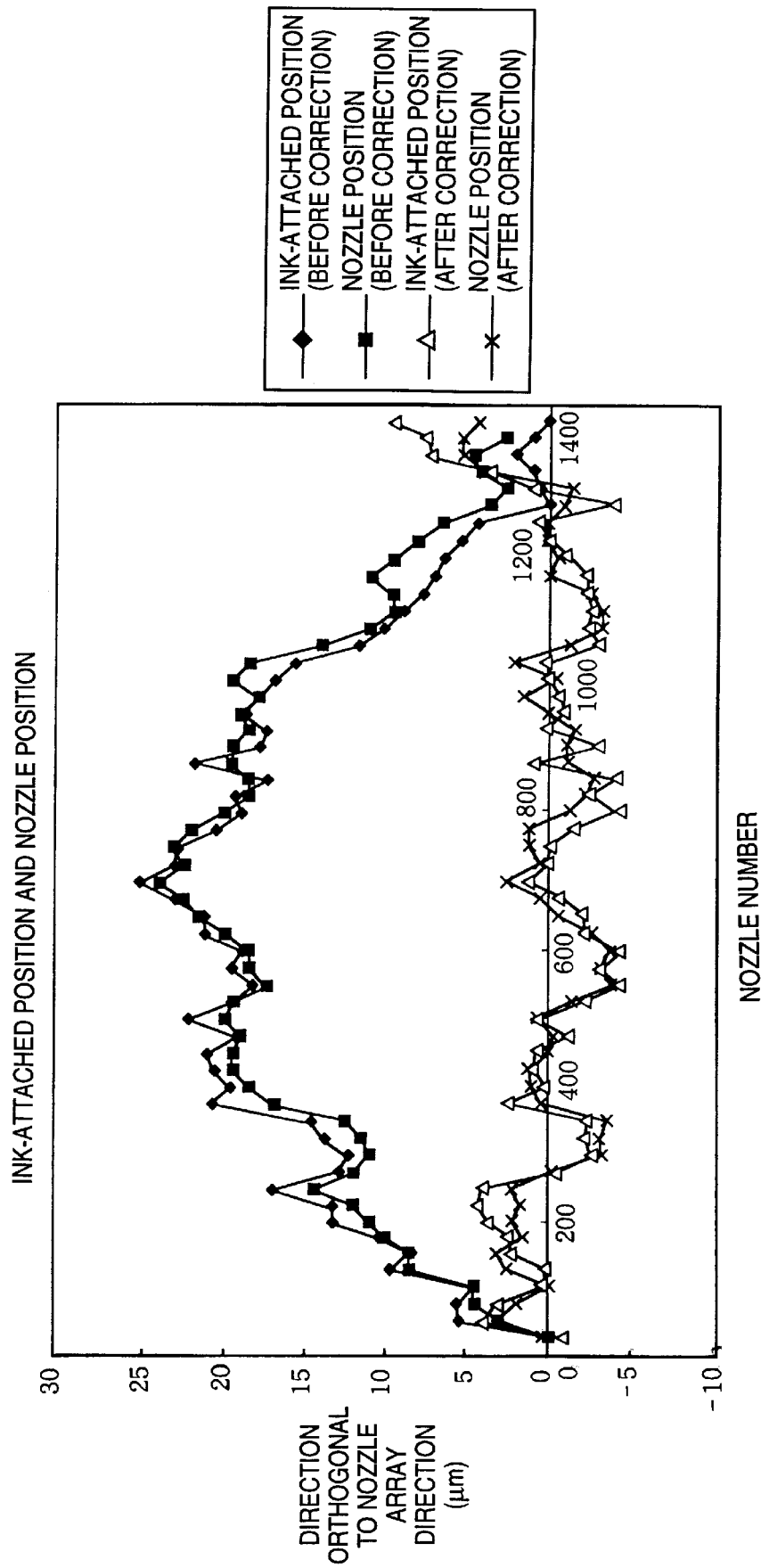
FIG. 16 is a graph which shows the relation between an ink applied position and a nozzle position.

The present inventor discloses in Japanese Patent Application No. 7-195235 that the shift of ink-attached position due to distortion of ink can be avoided by attaching ink onto the glass substrate before the ink droplets become in a spherical shape, thus realizes higher positional precision of ink attachment. When the ink-attached position is examined, it is found that the position approximately coincides with the position of a nozzle hole of the ink-jet head, as shown in FIG. 16.

That is, it has been experimentally known that the positional precision of the nozzle hole greatly influences the possibility of color mixture in coloring by using the ink-jet head.

Figure 17:
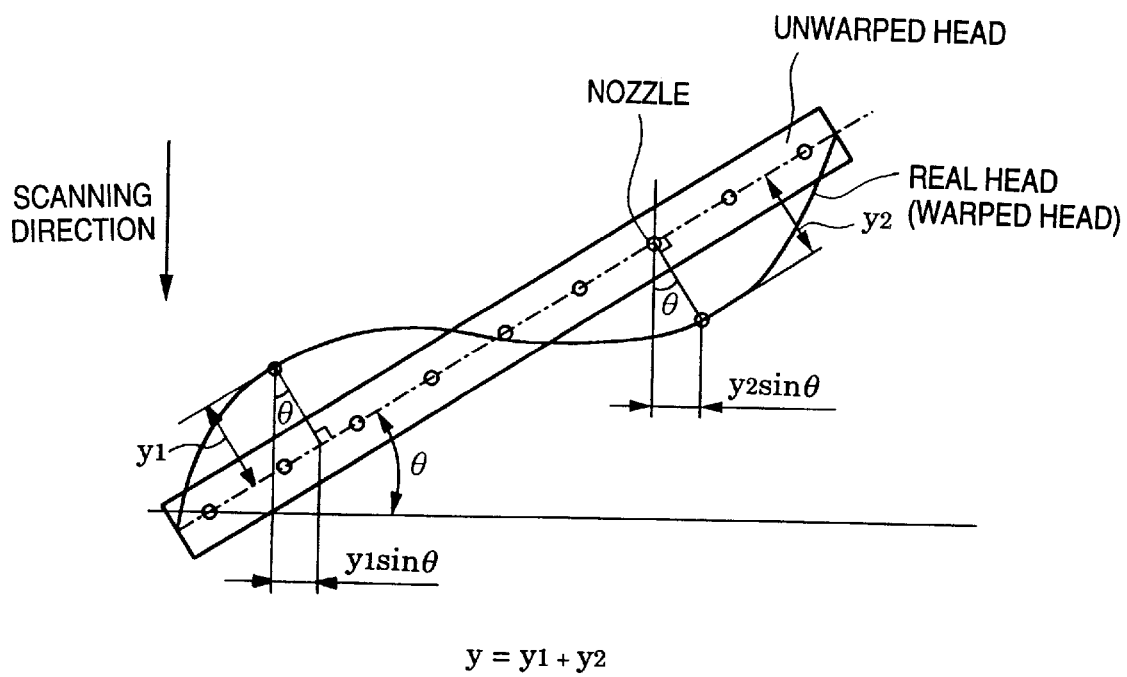
FIG. 17 is an explanatory view for explaining a offset of a nozzle in the direction of a pixel width, due to a curve of the head.

Accordingly, the present inventor has found that, as shown in FIGS. 15 and 17, the following expressions hold regarding the relation among the pixel width GL (distance between the centers of adjacent black matrices), the dot diameter CL (diameter of ink droplet attached onto the substrate), a positive nozzle shift amount $y_1$, i.e., the shift amount of nozzle shifted toward a positive side in a direction orthogonal to an ideal line of nozzle array (approximate straight line obtained by the least squares method) which is obtained if the ink-jet head is not warped, a negative nozzle shift amount $y_2$, i.e., the shift amount of nozzle shifted toward a negative side in the direction orthogonal to the ideal line of nozzle array, a slant angle $\theta$ of the ink-jet head in a direction (pixel width direction) orthogonal to the head scanning direction, and the ink-dot shift amount $\Delta x$ in the direction orthogonal to the scanning direction:

$$y = y_1 + y_2$$

$$\Delta x = y \cdot \sin\theta$$

$$\Delta x \leq GL - CL$$

That is, $$y \cdot \sin\theta \leq GL - CL$$

$$y \leq (GL - CL)/\sin\theta \ (0° < \theta < 90°) \qquad (1)$$

Note that the dot diameter CL is the diameter of ink droplet that has attached onto unpartitioned glass or glass where an ink-receptive layer is deposited and spreads until it dries. In an ink-jet head having nozzles of different ink-attachment diameters, the greatest diameter is employed as the diameter CL.

Accordingly, a color filter can be manufactured without color mixture by correcting the warp of the ink-jet head in accordance with the above-described correction method such that the nozzle shift amount y satisfies the expression (1). Otherwise, even if warp correction is not performed, a color filter can be manufactured without color mixture by coloring a filter substrate by using an ink-jet head having the nozzle shift amount y which satisfies the expression (1).

When manufacturing an ink-jet head, positional shift of nozzles also occurs in the nozzle-array direction to some extent. It is necessary that at least the nozzle shift amount in a direction orthogonal to the nozzle array satisfies the expression (1).

Note that in the expression (1), $0<\theta<90°$ holds, however, it is generally arranged such that $0<\theta\leq45°$ holds from the point of manufacturing efficiency.

In the experiment by the present inventor, the pixel width GL is 102.5 μm, the ink-dot diameter CL is 85 μm, and the ink-jet head is a 4-inch long head having 360 dpi resolution (ink is discharged by every 5th nozzle of 1408 nozzles) and is slanted at $\theta=29.27°$.

At this time, $y_1=y_2$ holds in the expression (1) since the positive and negative nozzle shift amounts are approximately the same. Accordingly, $$y \leq \pm\{(102.5-85)/\sin 29.27°\}/2$$

Therefore, $y \leq \pm 17.9$ μm holds.

The present inventor has performed warp correction on the ink-jet head in consideration of margin of ±10 μm such as precision of the apparatus, so that the warp is reduced to ±8 μm or less, and performed coloring by using this ink-jet head. As a result, a color filter has been manufactured without color mixture.

Note that the expression (1) is obtained on the assumption that the margin such as the precision of the apparatus is "0". When such margin is included, it is arranged such that the margin value is subtracted from the value obtained from the expression (1) as described above, and that the warp of the head is corrected to have a value equal to or less than the value obtained from the subtraction.

Figure 18:
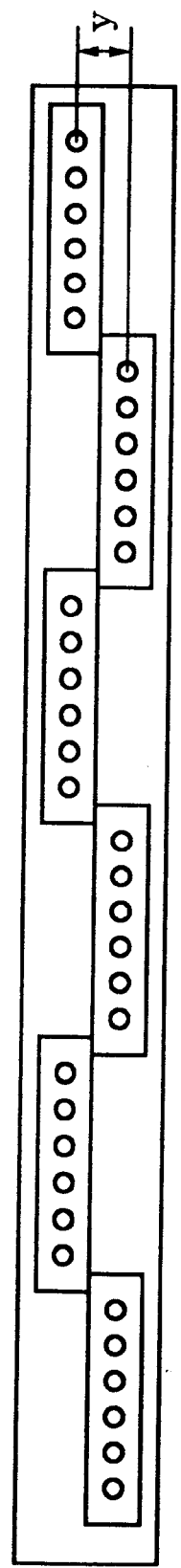
FIG. 18 is an explanatory view for explaining a position offset in the head unit where short heads are combined.

Note that FIG. 18 is an explanatory view showing the positional shift in a head unit where short heads are combined. In this example, the nozzle shift amount y is set to satisfy the expression (1).

Figure 19:
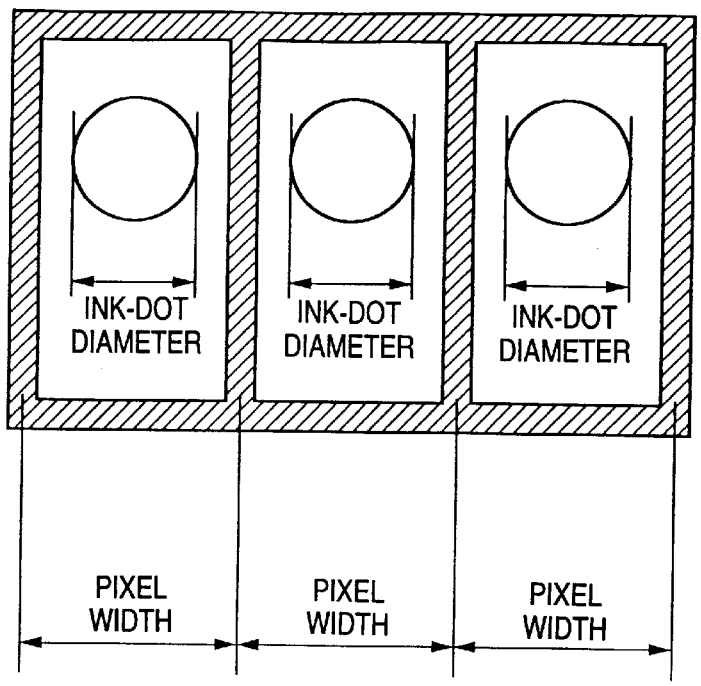
FIG. 19 is an explanatory view for showing the relation among a color filter, a pixel and an ink dot.
Figure 20:
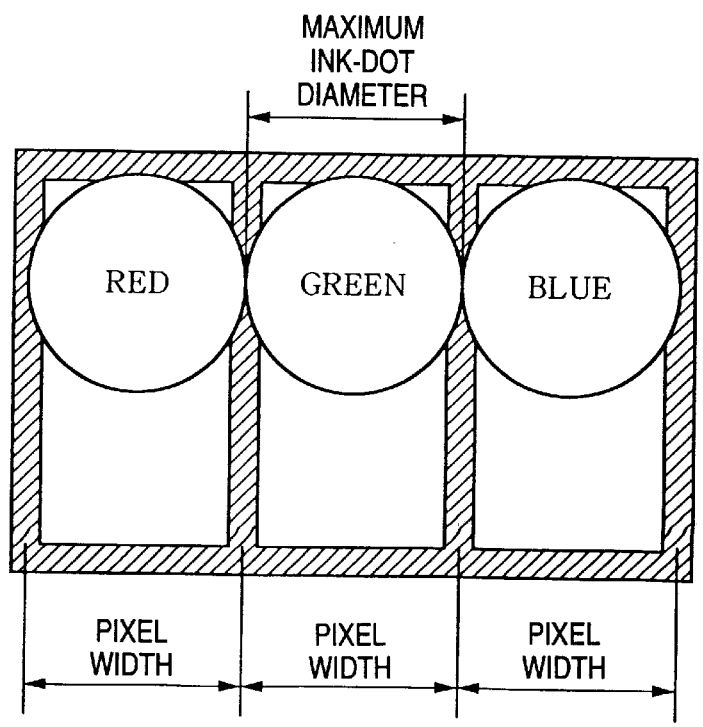
FIG. 20 is an explanatory view showing bounds of color mixture at the time of coloring a color filter.

FIG. 19 is an explanatory view showing the relation between color filter pixels and ink dots, and FIG. 20 is an explanatory view showing the maximum ink-dot diameter that avoids color mixture when coloring the color filter substrate.

As described above, according to the present embodiment, the temperature rise of the ink-jet head can be suppressed by attaching a plate having a large thermal capacity to the ink-jet head. This provides a color filter without positional shift of nozzles and without color mixture of pixels.

Further, in the present embodiment, the plate has screw holes, and the head main body has smaller screw holes. The warp of the ink-jet head can be corrected by pushing ink-jet head away from the plate or pulling it closer to the plate, at the position of each screw hole, while selectively inserting the bolt that can be just fit-screwed into the screw hole of the plate and the bolt of a smaller diameter that can be freely inserted through the hole and fit-screwed into the screw hole of the ink-jet head. This provides an ink-jet head where nozzles are arrayed exactly in a straight line.

Further, a color filter can be manufactured without color mixture by using an ink-jet head where the nozzle shift amount satisfies the expression (1).

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of the maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in the above-mentioned embodiment of the present invention, it is assumed that the ink is a liquid. Alternatively, the present invention may employ an ink which is solid at room temperature or less and softens or liquefies at room temperature, or an ink which liquefies upon application of a use printing signal.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

As described above, according to the present invention, the temperature rise of the ink-jet head can be suppressed by attaching a plate having a large thermal capacity to the ink-jet head. Thus, a color filter without positional shift of nozzles and without color mixture can be manufactured.

Further, the auxiliary member has screw holes and the ink-jet head main body has smaller screw holes. The warp of the ink-jet head can be corrected by pushing the ink-jet head away from the plate and pulling it closer to the plate, at the position of each screw hole, while selectively inserting the bolt that can be just fit-inserted into the screw hole and the bolt of a smaller diameter that can be freely inserted into the screw hole and screwed in the smaller screw hole.

Further, a color filter can be manufactured without color mixture by using an ink-jet head where the nozzle shift amount satisfies the expression (1).

The present invention is not limited to the above embodiment and various changes and modification can be made within the spirit and scope of the present invention. Therefore, to apprise the public of the scope of the present invention, the following claims are made.

What is claimed is:

1. An ink-jet head in which a plurality of ink discharge nozzles are arrayed in a lengthwise direction, used in a method for manufacturing a color filter, which has a substrate and a plurality of color filtering portions divided by a plurality of black matrix lines each of which has a predetermined width, by scanning said ink-jet head relatively to the substrate while performing coloring by discharging ink from said ink-jet head, wherein a width GL which is a distance between centers of two adjacent said black matrix lines arrayed in a direction orthogonal to a scanning direction, an ink dot diameter CL formed after an ink is applied onto the substrate, an acute slant angle $\theta$ of said ink-jet head in a direction orthogonal to the scanning direction, and a nozzle shift width y in a direction orthogonal to an ideal straight line where the plurality of ink-discharge nozzles are arrayed if said ink-jet head is not warped, satisfy $$y \leq (GL-CL)/\sin\theta \ (0°<\theta<90°)$$

when said ink-let head is warped.

2. The ink-jet head according to claim 1, wherein said ink-jet head discharges ink by utilizing thermal energy, and includes a thermal energy generator for generating thermal energy to be applied to the ink.

3. A color-filter manufacturing apparatus comprising the ink-jet head in claim 1 and a discharge controller which controls ink discharge from said head.

4. The ink-jet head unit according to claim 1, wherein CL is the diameter of the ink dot after the ink dot has spread on the substrate in the case that the ink is applied to the substrate which has an ink-receptive layer or to an unpartitioned substrate.

5. A color-filter manufacturing method for manufacturing a color filters which has a substrate and a plurality of color filtering portions divided by a plurality of black matrix lines each of which has a predetermined width, by scanning said ink-jet head, in which a plurality of ink-discharge nozzles are arrayed in a lengthwise direction, relatively to the substrate while performing coloring by discharging ink from said ink-let head, said method comprising the steps of:

providing a warped ink-let head; and correcting a warp of the ink jet head so as to satisfy $$y \leq (GL-CL)/\sin\theta \ (0°<\theta<90°),$$

wherein a width GL which is a distance between centers of two adjacent said black matrix lines arrayed in a direction orthogonal to a scanning direction, an ink dot diameter CL formed after an ink is applied onto the substrate, an acute slant angle $\theta$ of said ink-let head in a direction orthogonal to the scanning direction, and a nozzle shift width y in a direction orthogonal to an ideal straight line where the plurality of ink-discharge nozzles are arrayed if said ink-let head is not warped.

6. The ink-jet head unit according to claim 5, wherein CL is the diameter of the ink dot after the ink dot has spread on the substrate in the case that the ink is applied to the substrate which has an ink-receptive layer or to an unpartitioned substrate.

7. A method for reducing color mixture of a color filter which reduces color mixture in adjacent color filtering portions of a color filters which has a substrate and a plurality of color filtering portions divided by a plurality of black matrix lines each of which has a predetermined width, by scanning said ink-let head, in which a plurality of ink-discharge nozzles are arrayed in a lengthwise direction, relatively to the substrate while performing coloring by discharging ink from said ink-let head, said method comprising the steps of:

providing a warped ink-let head; and correcting a warp of the ink jet head so as to satisfy $$y \leq (GL-CL)/\sin\theta \ (0°<\theta<90°),$$

wherein a width GL which is a distance between centers of two adjacent said black matrix lines arrayed in a direction orthogonal to a scanning direction, an ink dot diameter CL formed after an ink is applied onto the substrate, an acute slant angle θ of said ink-let head in a direction orthogonal to the scanning direction, and a nozzle shift width y in a direction orthogonal to an ideal straight line where the plurality of ink-discharge nozzles are arrayed if said ink-jet head is not warped.

8. The ink-jet head unit according to claim 7, wherein CL is the diameter of the ink dot after the ink dot has spread on the substrate in the case that the ink is applied to the substrate which has an ink-receptive layer or to an unpartitioned substrate.

9. An ink-jet head unit having a plurality of ink-jet heads each having a plurality of ink-discharge nozzles arrayed in a lengthwise direction, used in a method for manufacturing a color filter, which has a substrate and a plurality of color filtering portions divided by a plurality of black matrix lines each of which has a predetermined width, by scanning said ink-jet head relatively to the substrate while performing coloring by discharging ink from said ink-jet head, wherein a width GL which is a distance between centers of two adjacent said black matrix lines arrayed in a direction orthogonal to a scanning direction, an ink dot diameter CL formed after an ink is applied onto the substrate, an acute slant angle θ of said ink-jet head in a direction orthogonal to the scanning direction, and a nozzle shift width y in a direction orthogonal to an ideal straight line where the plurality of ink-discharge nozzles are arrayed if said ink-jet head is not warped, satisfy $y \leq (GL-CL)/\sin\theta \ (0°<\theta<90°)$ when said ink-jet head is warped.

10. The ink-jet head unit according to claim 9, wherein said ink-jet head discharges ink by utilizing thermal energy, and includes a thermal energy generator for generating thermal energy to be applied to the ink.

11. The ink-jet head unit according to claim 9, wherein CL is the diameter of the ink dot after the ink dot has spread on the substrate in the case that the ink is applied to the substrate which has an ink-receptive layer or to an unpartitioned substrate.

12. A color-filter manufacturing method for manufacturing a color filters which has a substrate and a plurality of color filtering portions divided by a plurality of black matrix lines each of which has a predetermined width, by scanning an ink-jet head unit having a plurality of ink-let heads each having a plurality of ink-discharge nozzles arrayed in a lengthwise direction relatively to the substrate while performing coloring by discharging ink from said ink-jet head, said method comprising the steps of:

providing a warped ink-let head; and correcting a warp of the ink let head so as to satisfy $y \leq (GL-CL)/\sin\theta \ (0°<\theta<90°)$, wherein a width GL which is a distance between centers of two adjacent said black matrix lines arrayed in a direction orthogonal to a scanning direction, an ink dot diameter CL formed after an ink is applied onto the substrate, an acute slant angle θ of said ink-let head in a direction orthogonal to the scanning direction, and a nozzle shift width y in a direction orthogonal to an ideal straight line where the plurality of ink-discharge nozzles are arrayed if said ink-jet head is not warped.

13. The ink-jet head unit according to claim 12, wherein CL is the diameter of the ink dot after the ink dot has spread on the substrate in the case that the ink is applied to the substrate which has an ink-receptive layer or to an unpartitioned substrate.

14. A method for reducing color mixture of a color filter which reduces color mixture in adjacent color filtering portions of a color filters which has a substrate and a plurality of color filtering portions divided by a plurality of black matrix lines each of which has a predetermined width, by scanning an ink-let head unit having a plurality of ink-let heads each having a plurality of ink-discharge nozzles arrayed in a lengthwise direction, relatively to the substrate while performing coloring by discharging ink from said ink-jet head, said method comprising the steps of:

providing a warped ink-let head; and correcting a warp of the ink let head so as to satisfy $y \leq (GL-CL)/\sin\theta \ (0°<\theta<90°)$, wherein a width GL which is a distance between centers of two adjacent said black matrix lines arrayed in a direction orthogonal to a scanning direction, an ink dot diameter CL formed after an ink is applied onto the substrate, an acute slant angle θ of said ink-jet head in a direction orthogonal to the scanning direction, and a nozzle shift width y in a direction orthogonal to an ideal straight line where the plurality of ink-discharge nozzles are arrayed if said ink-jet head is not warped.

15. The ink-jet head unit according to claim 14, wherein CL is the diameter of the ink dot after the ink dot has spread on the substrate in the case that the ink is applied to the substrate which has an ink-receptive layer or to an unpartitioned substrate.

* * * * *

UNITED STATES PATENT AND TRADEMARK OFFICE
CERTIFICATE OF CORRECTION

PATENT NO. : 6,109,727
DATED : August 29, 2000
INVENTOR(S) : Makoto Akahira et al.

It is certified that error appears in the above-identified patent and that said Letters Patent is hereby corrected as shown below:

Title page,
FOREIGN PATENT DOCUMENTS, "8/1998" should read -- 8/1988 --.

Sheet 11:
FIG. 12, "NOZZEL" should read -- NOZZLE --.

Column 1:
Line 60, "compensate" should read -- compensate for --.

Column 3:
Line 40, "an" (first occurrence) should read -- a --; and
Line 53, "an" should read -- a --.

Column 4:
Line 39, "and" should be deleted.
Line 40, "plate." should read -- plate; --; and
Line 45, "a" should read -- an --.

Column 6:
Line 18, "a" (second occurrence) should read -- an --.
Line 31, "have" should read -- has --.
Line 46, "(cross linking" should read -- (cross-linking --; and
Line 47, "(cross linking" should read -- (cross-linking --.

Column 7:
Line 12, "ink is" should read -- inks are --.
Line 19, "both" should be deleted; and
Line 24, "the" should be deleted.

Column 8:
Line 9, "of 31.70" should read -- of 31.7° --.
Line 10, "nozzles are" should read -- nozzle is --.
Line 39, "of" should be deleted; and
Line 43, "of" (first occurrence) shoud be deleted.

Column 9:
Line 10, "a" should read -- an --.

UNITED STATES PATENT AND TRADEMARK OFFICE
CERTIFICATE OF CORRECTION

PATENT NO. : 6,109,727
DATED : August 29, 2000
INVENTOR(S) : Makoto Akahira et al.

It is certified that error appears in the above-identified patent and that said Letters Patent is hereby corrected as shown below:

Column 10:
Line 16, "a" should be deleted.
Line 29, "become in" should read -- assume --; and
Line 30, "realizes" should read -- realizing --.

Column 13:
Line 50, "modification" should read -- modifications --.

Column 14:
Line 9, 29, 30, 39, 43, 54, 58, and 60, "ink-let" should read -- ink-jet --.
Line 23, and 51 "filters" should read -- filter, --; and
Line 61, "ink-jet" should read -- ink-jet --.

Column 15:
Line 3, and 47, "ink-let" should read -- ink-jet --.
Line 44, "filters" should read -- filters, --;

Column 16:
Line 1, 2, 10, and 32 "ink-let" should read -- ink-jet --.
Line 23, "filters" should read -- filter, --.
Line 26, "ink-let" (both occurrences) should read -- ink-jet --; and
Line 31, "ink-let" should read -- in-jet --.

Signed and Sealed this

Thirteenth Day of November, 2001

Attest:

NICHOLAS P. GODICI
Attesting Officer   Acting Director of the United States Patent and Trademark Office